Patented Nov. 2, 1926.

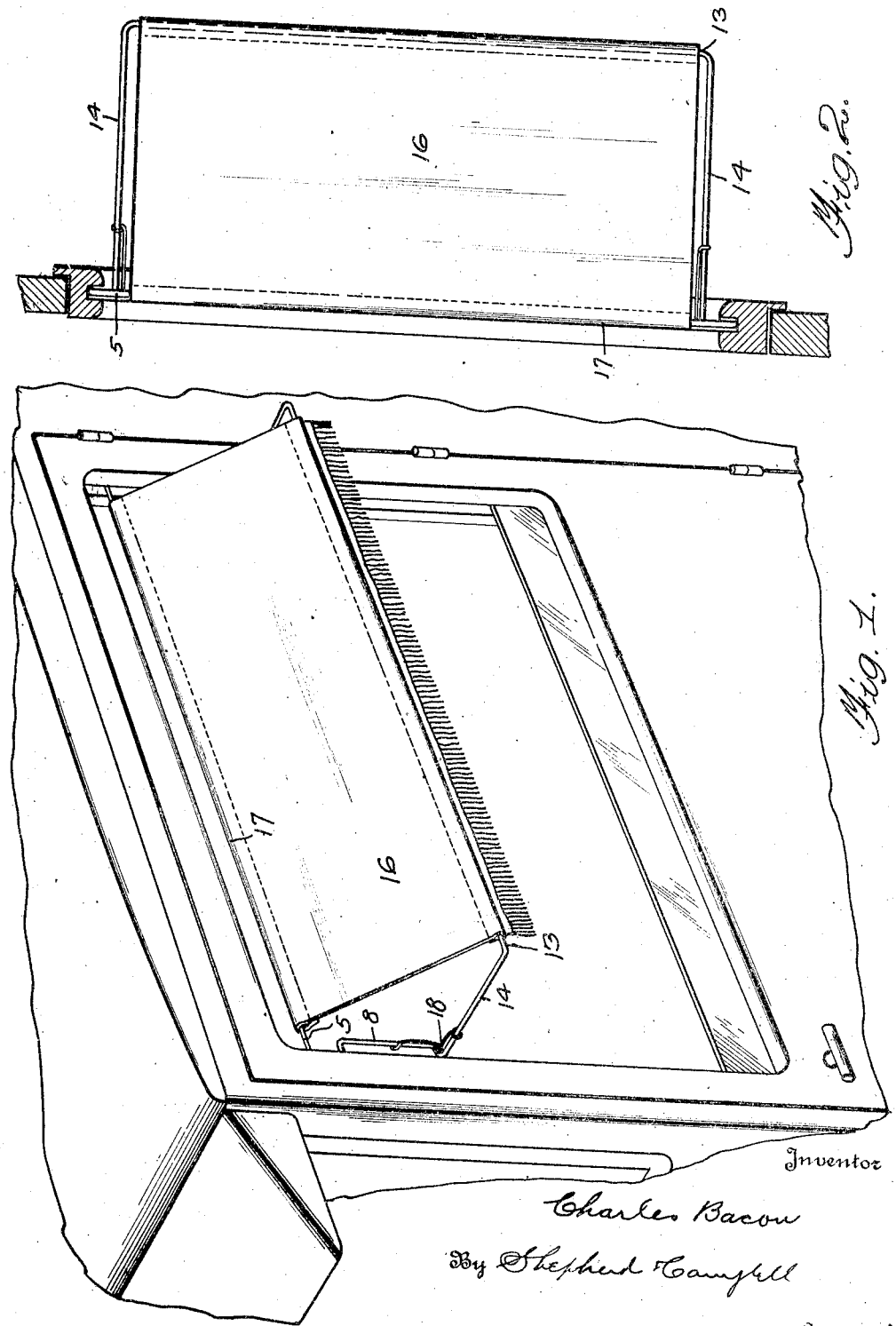

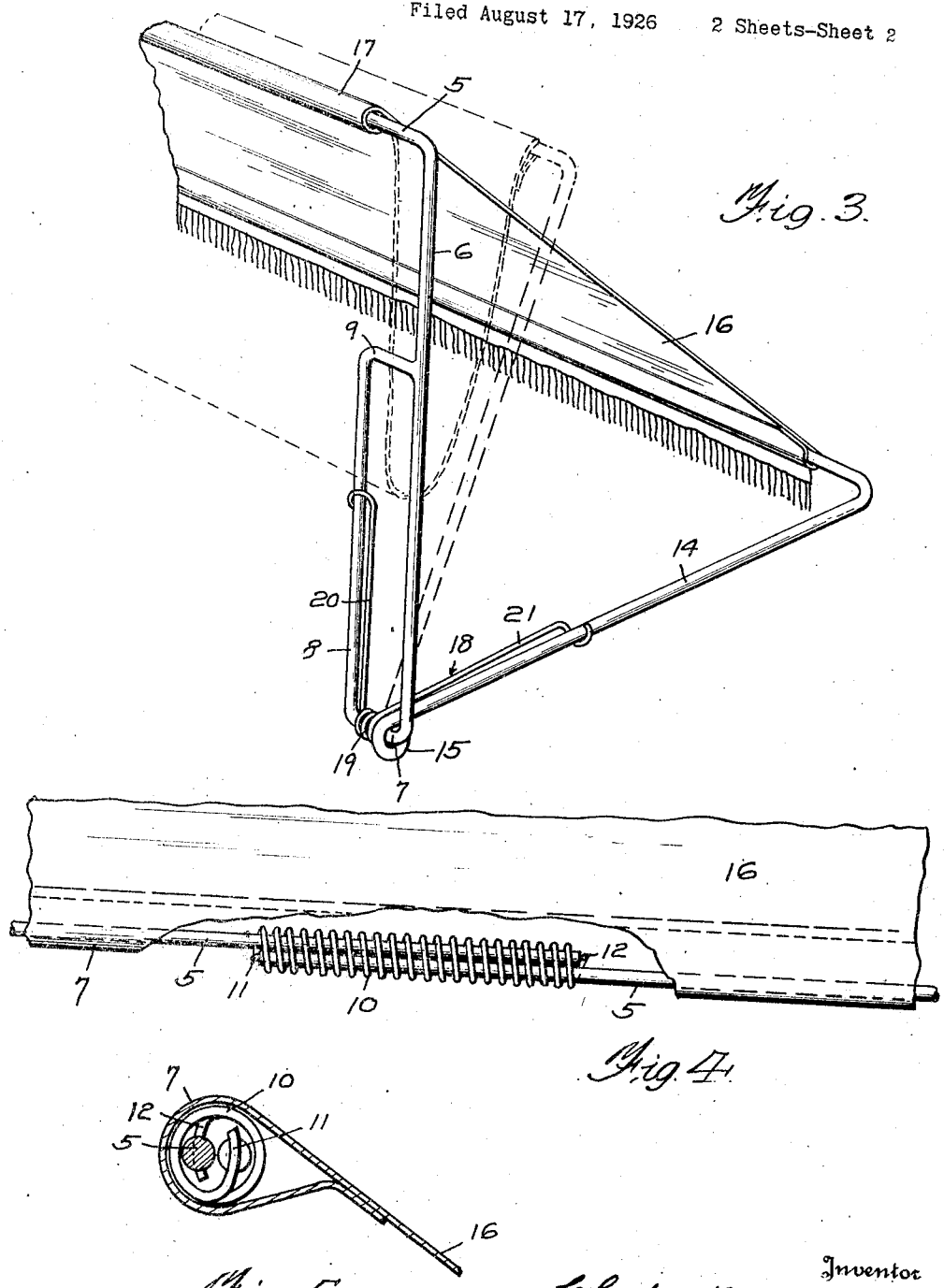

1,605,199

UNITED STATES PATENT OFFICE.

CHARLES BACON, OF KANSAS CITY, MISSOURI.

DETACHABLE AWNING FOR AUTOMOBILES.

Application filed August 17, 1926. Serial No. 129,751.

This invention relates to awnings for automobiles of the character of that shown in U. S. Patent No. 1,595,887, issued on the tenth day of August, 1926.

Like the structure of the patent referred to, the device of the present invention comprises an awning web and a supporting frame for the same, the end members of which frame are movable toward and from each other and are thrust apart by the action of a spring to cause them, when released, to spring outwardly and engage in the usual glass grooves of an automobile body or door.

It is desirable in an automobile awning to provide means for holding the awning web taut or in distended position so that the awning will not flap up and down under the jolting action of the vehicle.

In the patent above referred to, the awning web is maintained in taut position, because the upper edge of the awning web is secured to a spring wound roller.

It is a primary object of the present invention to provide a structure which will eliminate the more or less expensive spring roller and yet will provide efficient means for maintaining the awning web taut. At the same time all of the advantages of the structure which is spring extended to engaging position, are retained.

Further objects and advantages of the invention will be set forth in the following description.

In the accompanying drawing—

Fig. 1 is a perspective view of the awning of the present invention, showing the same applied to an automobile door.

Fig. 2 is a horizontal sectional view through said door with the awning in position.

Fig. 3 is a fragmentary perspective view upon an enlarged scale, of one end of the awning.

Fig. 4 is a fragmentary view showing the hem at the upper edge of the awning web broken away, to illustrate the spring means for thrusting the frame members of the awning apart and Fig. 5 is a detail sectional view, upon an enlarged scale, upon line 5—5 of Fig. 4.

Like numerals designate corresponding parts in all of the figures of the drawing.

The supporting frame of the awning comprises two substantially identical frame members, each of which comprises a horizontal rod 5, which at its outer end is bent into a vertical leg 6. At the lower ends of these vertical legs, the material is bent inwardly at 7, upwardly at 8 and inwardly at 9, the portions 9 being rigidly fixed to the vertical legs 6. The inner ends of the horizontal portions 5 are disposed in overlapping relation (see Fig. 4) and said overlapping portions lie within a tension spring 10. The terminal ends 11 and 12 of said spring are bent in such manner as to cause them to lie across and be pressed against by the ends of the rods 5. Thus, it is manifest that if the end frame members constituted by the legs 6 and associated parts are moved toward each other the spring will be distended and that when they are released the spring will act to thrust the end frame members away from each other. The legs 6 are shaped and dimensioned to adapt them to enter and have a firm engagement in the glass grooves of an automobile door, it being understood that the awning is put in place after the glass of the door has been lowered. A U-shaped spreader comprising a front bar 13 and end legs 14 is pivoted, as at 15, to the horizontal portions 7 at the lower ends of the legs 6. The lower edge of an awning web 16 is engaged with the bar 13 and the upper end of said awning web is provided with an enlarged hem 17 constituting a pocket through which the rods 5 pass and in which the spring 10 is disposed.

It is clear that the proposed structure is one which may be very economically manufactured because it comprises very simple and inexpensive parts. However, it lacks the advantage of the spring roller referred to, in that the spring 10 does not tend to keep the awning web taut. To provide means for holding the spreader in lowered position and to hold the awning web taut under the jolting action of the vehicle. I provide springs 18 comprising the coiled portions 19, which are wound about the horizontal portions 7, and legs 20 and 21 which are engaged respectively with the portions 8 of the frame and the bars 14, said springs being of a nature to tend to move the awning to open position and to hold the web 16 in taut and distended condition. When the awning is to be closed and stored the engagement of the legs may be reversed to cause the springs to tend to move the awning to closed instead of to open position.

It is to be understood that the invention is not limited to the precise construction set forth but that it includes within its purview whatever changes fairly come within either the terms or the spirit of the appended claims.

Having described my invention what I claim is:

1. A device of the character described comprising a supporting frame, which includes end members shaped and dimensioned to engage in the glass grooves of an automobile, a spreader hingedly connected thereto, an awning the lower edge of which is connected to the spreader and the upper edge of which is connected to the supporting frame and spring means lying inwardly of the said members and wholly outside of said glass grooves when in use, said spring means engaging the supporting frame and the spreader and tending to move the awning to open position and to hold the awning web under tension.

2. A device of the character described comprising a laterally extensible two part frame having end members shaped and dimensioned to engage in the glass grooves of an automobile, a spreader hingedly connected thereto, an awning web engaged with the spreader and with the frame, and spring means lying inwardly of the said end members and wholly outside of said glass grooves when in use, said spring means acting between the awning frame and the spreader and tending to move the awning to open position and to hold the awning web under tension under the jolting and jarring to the said automobile.

3. A structure of the character described comprising a two part awning frame, each part of which comprises a horizontal member and a vertical member, said vertical members being shaped and dimensioned to enter the glass grooves of an automobile and the inner ends of said horizontal members being disposed in overlapping relation, a tension spring arranged to be placed under tension by the movement of the end members toward each other, a U-shaped spreader the legs of which are pivotally engaged with the lower portions of said end members and spring means lying wholly inwardly of the said vertical members and free of said glass grooves acting between said end members and the spreader and tending to move the awning to open position and to hold the awning web under tension.

4. A structure of the character described comprising a two part frame, each of which comprises a horizontal rod and a vertical end rod bent therefrom, said end rods being shaped and dimensioned to enter the glass grooves of an automobile door, said end members being bent at the lower ends of said rods inwardly to form horizontal portions, then upwardly and then inwardly and being united with the vertical end members, a U-shaped spreader the legs of which are pivotally connected to the last named horizontal portions and springs comprising convolutions bent about the last named horizontal portions and having legs engageable with the legs of the spreader and with the said upwardly bent portions of the end members, said springs acting to move the spreader outwardly and downwardly and an awning web the lower edge of which is engaged with said spreader and the upper edge of which is engaged with said horizontal members.

5. A device of the character described comprising a two part frame member, each of said parts comprising a horizontal run the inner ends of which are in overlapping relation and a tension spring embracing said overlapping portions, the end convolutions of said spring being bent to lie in the path of movement of the ends of the respective rods.

6. A structure of the character described comprising a frame consisting of a horizontal part and vertical end members, each of said end members comprising two spaced vertical runs, connected at their lower ends by a horizontal member, the outer of said spaced vertical runs being shaped and dimensioned to engage in the glass grooves of an automobile, a U-shaped spreader the legs of which are pivotally connected to the said horizontal members, and springs comprising coils engaged about said horizontal members and legs extending from said coils and engaged respectively with the frame and with the spreader and acting to throw the spreader outwardly and downwardly.

In testimony whereof I affix my signature.

CHAS. BACON.